J. G. REID.
COTTON SEED DELINTING MACHINE.
APPLICATION FILED SEPT. 20, 1911.
1,014,518.
Patented Jan. 9, 1912.
4 SHEETS—SHEET 1.
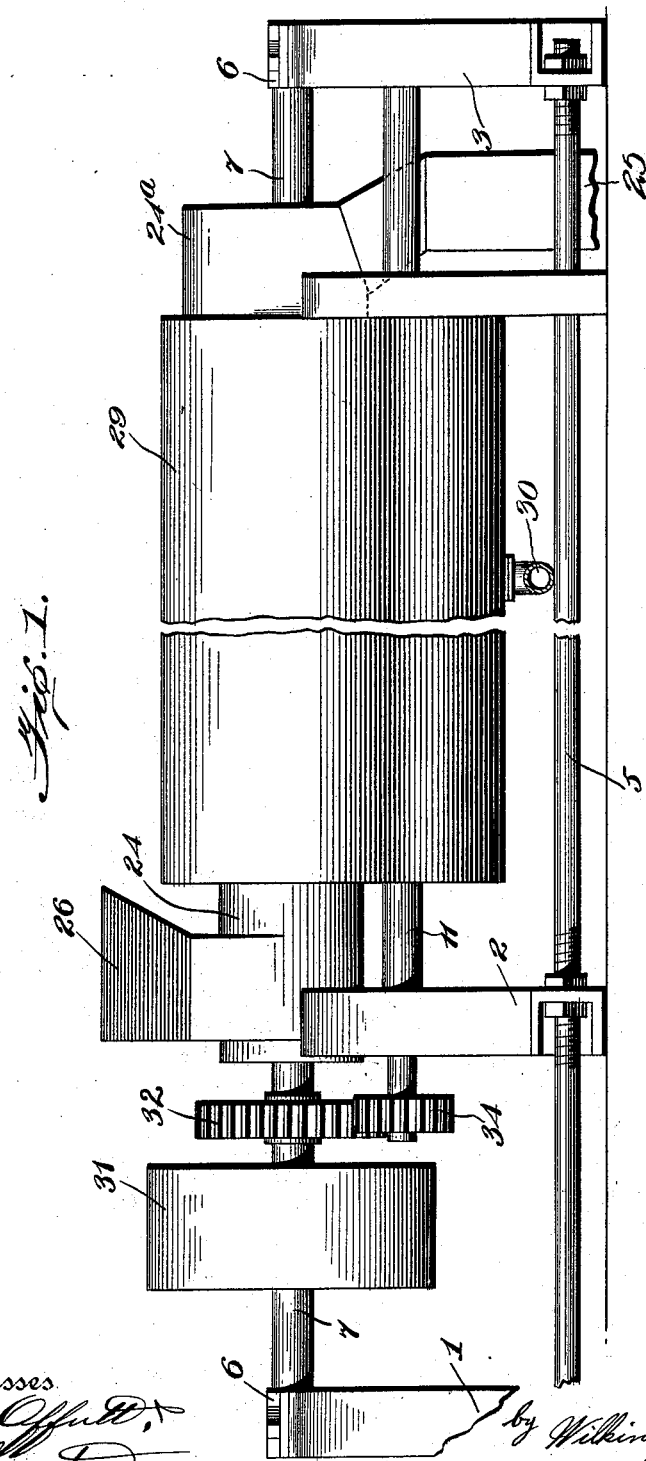

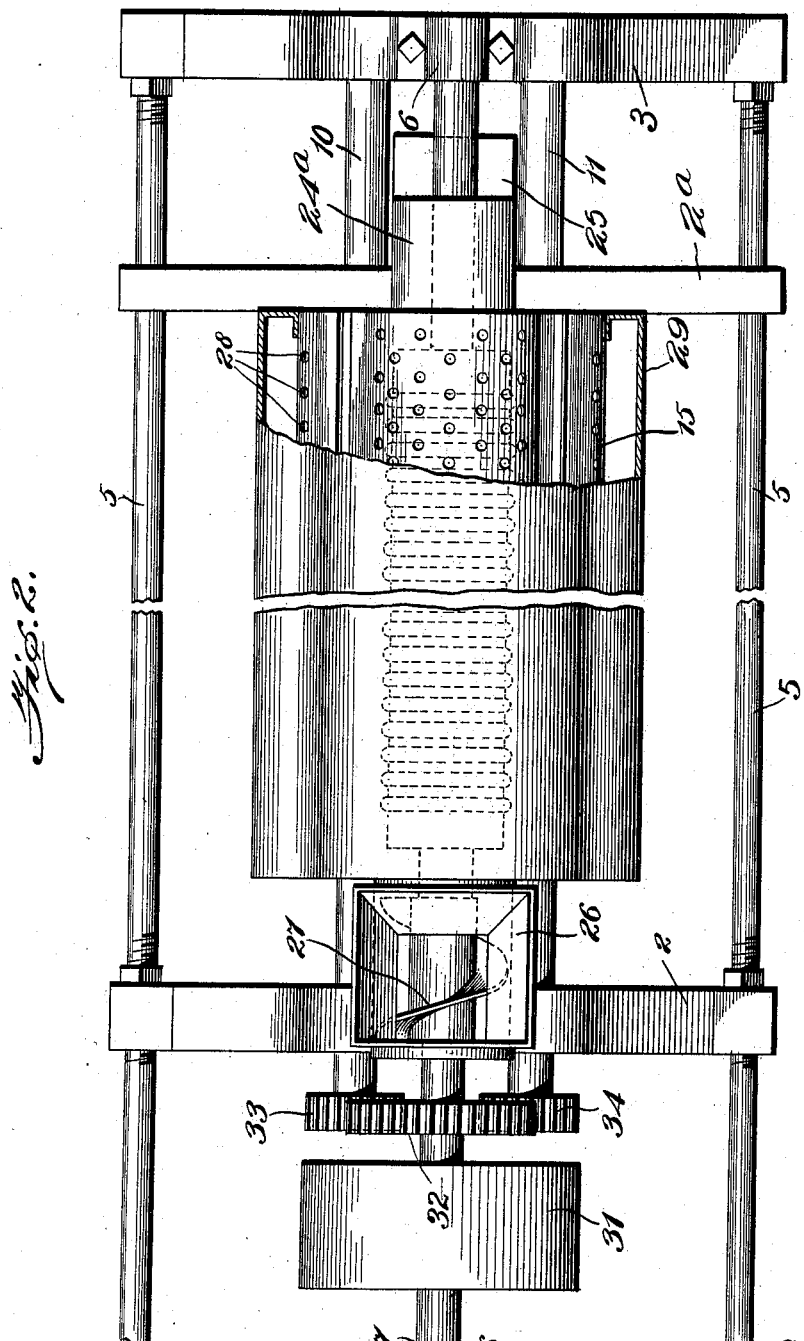

J. G. REID.
COTTON SEED DELINTING MACHINE.
APPLICATION FILED SEPT. 20, 1911.
1,014,518.
Patented Jan. 9, 1912.
4 SHEETS—SHEET 3.
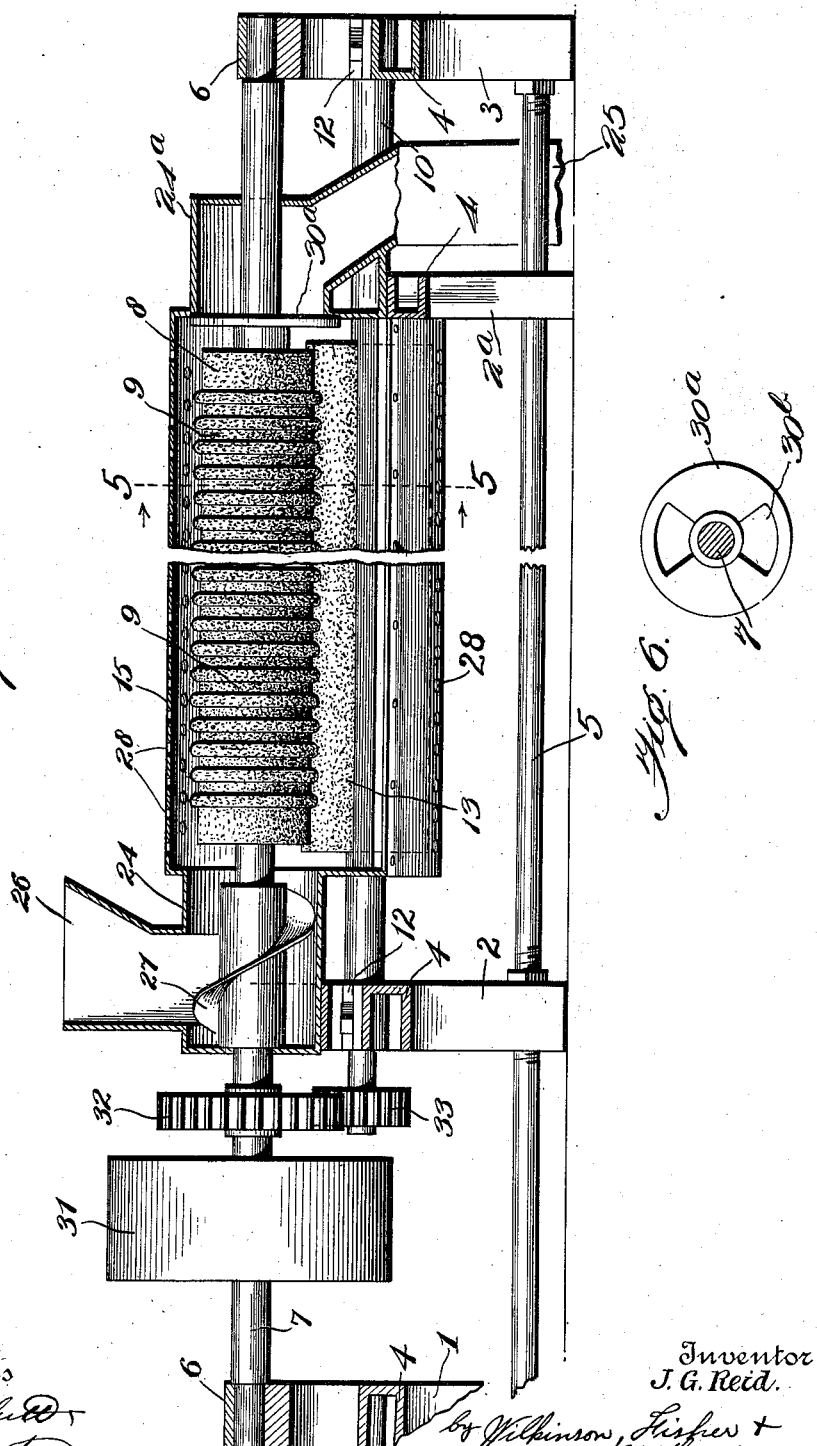

J. G. REID.
COTTON SEED DELINTING MACHINE.
APPLICATION FILED SEPT. 20, 1911.
1,014,518.
Patented Jan. 9, 1912.
4 SHEETS—SHEET 4.
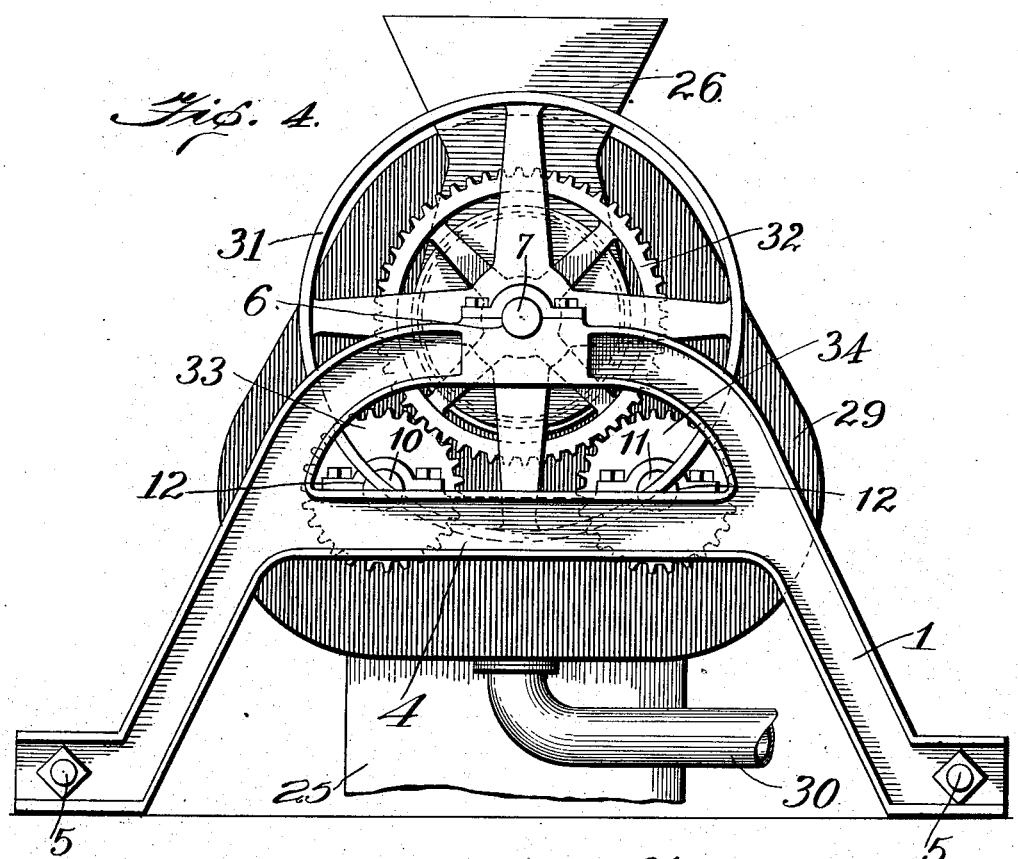
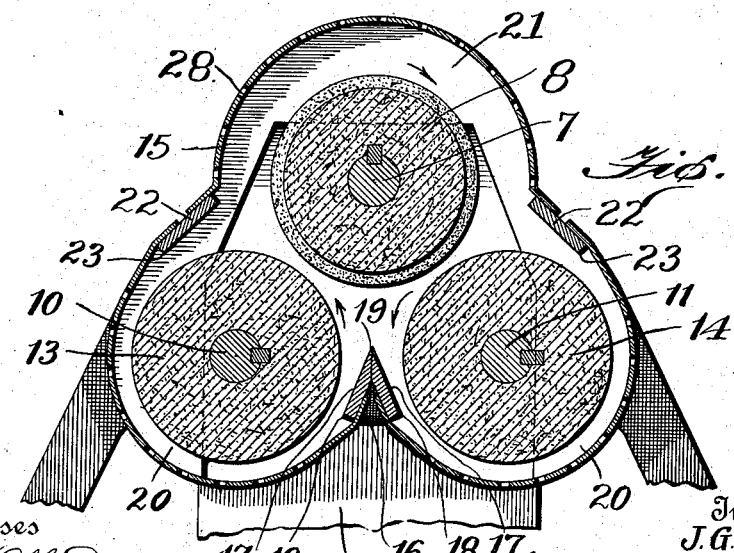

UNITED STATES PATENT OFFICE.

JOSEPH G. REID, OF ATLANTA, GEORGIA.

COTTON-SEED-DELINTING MACHINE.

1,014,518.　　　　Specification of Letters Patent.　　Patented Jan. 9, 1912.

Application filed September 20, 1911. Serial No. 650,428.

*To all whom it may concern:*

Be it known that I, JOSEPH G. REID, a citizen of the United States, residing at Atlanta, in the county of Fulton and State of Georgia, have invented certain new and useful Improvements in Cotton-Seed-Delinting Machines; and I do hereby declare the following to be a full, clear, and exact description of the invention, such as will enable others skilled in the art to which it appertains to make and use the same.

This invention relates to improvements in cotton seed delinting machines of the roller type, and has for its object to provide a practically constructed machine which will efficiently remove the soft fiber or lint from the cotton seed.

Another object of the invention is to so arrange the rollers in the casing and provide scraping bars on the inside thereof in order to prevent the material choking the machine and therefore require a minimum of driving power.

With the above and other objects in view, the invention consists in certain combinations and arrangements of parts hereinafter described and the novel features thereof will be particularly pointed out in the appended claims.

The preferred embodiment of the invention is illustrated in the accompanying drawings, in which like characters of reference indicate corresponding parts.

Figure 1 is a side elevation of a delinting machine constructed in accordance with my invention; Fig. 2 is a plan view of same, a portion of the outer casing being broken away to more clearly show the inner construction; Fig. 3 is a longitudinal sectional view of the machine, the outer casing being omitted; Fig. 4 is an end view of the machine on an enlarged scale looking from the left of Fig. 1; Fig. 5 is a cross sectional view on an enlarged scale taken on line 5—5 of Fig. 3; and Fig. 6 is an elevational view of the apertured disk carried by the main shaft which is shown in section.

The frame of the machine consists of a plurality of upright standards or brackets 1, 2, 2ª and 3 formed with cross beams 4 and rigidly connected together by longitudinally extending bracing rods 5. The brackets 1 and 3 are provided with suitable alining bearings 6 in which are journaled the ends of a main shaft 7 having fixed thereto intermediate the brackets 2 and 3 a carborundum roller 8 which has a corrugated or grooved surface 9 for preventing a too rapid travel of the material through the machine.

Positioned below the main shaft 7 and at each side thereof are auxiliary shafts 10 and 11 supported by suitable alining bearings 12 of the cross beams 4 of the brackets 2 and 3 and carrying carborundum rollers 13 and 14 which are arranged in spaced relation to each other and also with respect to the corrugated roller 8. The rollers 8, 13 and 14 are inclosed in a casing 15 concentric to the outer surface of same and projecting upwardly between the rollers 13 and 14 as at 16 and carrying bars 17 having sharp projecting corners 18 serving as scrapers and terminating in an edge 19. The space 20 between the surfaces of the rollers 13 and 14 and the casing 15 is substantially one-fourth that of the space 21 between the corrugated roller 8 and the upper portion of the casing. Secured to the inside of the casing 15 are longitudinally extending scraper bars 22 of rectangular cross section having their lower projecting corners 23 substantially in alinement with the tops of the rollers 13 and 14. The bars 17 and 22 scrape off a portion of the material clinging to the rollers and prevent same from choking the lower portion of the casing. The forward end of the casing 15 terminates in a cylindrical chamber 24 which rests on the bracket 2 and at the rear end in a similar cylindrical chamber 24ª supported on the bracket 2ª, and from the chamber 24ª extends an outlet pipe 25. Leading to the cylindrical chamber 24 is a hopper 26 for feeding cotton seed to a worm conveyer 27 fixed on the main shaft 7, which conveyer forces the cotton seed through the casing 15 where it is operated upon by the rollers to remove therefrom the soft fiber or lint.

The casing 15 is perforated as at 28 for permitting the escape of the lint which is drawn through the perforations into an outer casing 29 surrounding the casing 15 by suitable suction means connected with a pipe 30, extending from a suitable portion of the outer casing. The perforations of the casing 15 tend to retard the revolving of the clinging cotton seeds on the rollers and therefore more efficiently remove the soft fiber or lint. A disk 30$^a$ provided with suitable sized apertures 30$^b$ is secured to the main shaft 7 for the purpose of preventing a too rapid escape of the cotton seeds to the rear chamber 24$^a$.

The rollers 8, 13 and 14 may be rotated in the direction indicated by the arrows, Fig. 5, from any suitable source of power driving a pulley 31 fixed to the main shaft 7 which carries a gear wheel 32 meshing with pinions 33 and 34 keyed to the auxiliary shafts 10 and 11, said pinions being approximately half the diameter of the gear wheel whereby the rollers 13 and 14 rotate at a speed twice that of the corrugated roller 8.

It is apparent that a machine constructed as above described is capable of efficiently removing the soft fiber or lint from cotton seed, and on account of the particular arrangement of the rollers, the form of the casing and the arrangement of the scraping bars that the machine will not become choked by the material and consequently a minimum of power is required for driving the machine.

It is to be understood that slight changes in the form, proportion and minor details of construction may be resorted to without sacrificing any of the advantages or departing from the principle of the invention.

Having fully described my invention, what I claim is:—

1. In a delinting machine, the combination of a support; a corrugated cylindrical abrasive roller journaled in said support; a pair of supplemental cylindrical abrasive rollers journaled in said support, said supplemental rollers disposed below, radially of and adjacent the main roller, and the peripheral surfaces of said rollers providing a working space; a three lobed casing surrounding said rollers and having the curved surfaces thereof conforming with said rollers; a gear wheel carried by the corrugated roller; and relatively smaller gear wheels carried by said supplemental rollers and meshing with said first named gear wheel whereby to drive the supplemental rollers at an accelerated speed relatively to the main roller, substantially as described.

2. In a delinting machine, the combination of a casing; a main and supplemental cylindrical abrasive rollers journaled in said casing; each of said supplemental rollers disposed radially of and adjacent the main roller, and the peripheral surfaces of said rollers providing a working chamber therebetween and with said casing; scrapers mounted on said casing located intermediate of, and above and to either side of said supplemental rollers; and a gearing connecting said rollers and adapted to drive the supplemental rollers at an accelerated speed relatively to the main roller, substantially as described.

3. In a delinting machine, the combination of three horizontally arranged rotatable abrasive rollers, the rollers being arranged in spaced relation one centrally positioned above the other two, a casing concentric with the outer surfaces of the rollers and projecting upwardly between the two lower rollers, the lower portions of the casing being arranged substantially one fourth the distance from the surfaces of the lower rollers as the upper portion of the casing is from the surface of the upper roller, scraping bars carried by said upwardly projecting portion of the casing, bars fixed to the inner side of the casing and having scraping edges arranged approximately in alinement with the tops of the lower rollers, and a conveyer rotatable with the upper roller for forcing material through the casing, substantially as described.

4. In a delinting machine, the combination of a main shaft, an abrasive roller fixed to the main shaft, auxiliary shafts arranged below the main shaft and at each side thereof, abrasive rollers carried by the auxiliary shafts and arranged in spaced relation with each other and with the upper roller, a casing concentric with the surfaces of the rollers for inclosing same, a cylindrical chamber extending from one end of the casing in alinement with the upper roller, the casing having an outlet at its other end in alinement with the upper roller, a hopper leading to the cylindrical chamber, a worm conveyer fixed to the main shaft within the cylindrical chamber, a driving pulley fixed to the main shaft, a gear wheel secured to the main shaft, and pinions fixed to the auxiliary shafts and meshing with the gear wheel, said pinions being half the diameter of the gear wheel whereby the lower rollers rotate twice as fast as the upper roller, substantially as described.

5. In a delinting machine, the combination of a main shaft, an abrasive roller fixed to the main shaft, auxiliary shafts arranged below the main shaft and at each side thereof, abrasive rollers carried by the auxiliary shafts and arranged in spaced relation with each other and with the upper roller, means for rotating said shafts, a casing inclosing the rollers, the casing being provided with a discharge opening, a conveyer fixed to the main shaft for forcing material through the casing, and a disk provided with apertures rotatable with the main shaft for preventing a too rapid escape of the material through the discharge opening, substantially as described.

In testimony whereof, I affix my signature, in presence of two witnesses.

JOSEPH G. REID.

Witnesses:
L. CAMPBELL,
DANIEL MACDOUGALD.

Copies of this patent may be obtained for five cents each, by addressing the "Commissioner of Patents, Washington, D. C."